(12) United States Patent
Uchida

(10) Patent No.: US 8,154,447 B2
(45) Date of Patent: Apr. 10, 2012

(54) POSITION CALCULATING METHOD AND POSITION CALCULATING DEVICE

(75) Inventor: Shuji Uchida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 268 days.

(21) Appl. No.: 12/613,261

(22) Filed: Nov. 5, 2009

(65) Prior Publication Data

US 2010/0117901 A1 May 13, 2010

(30) Foreign Application Priority Data

Nov. 11, 2008 (JP) ................................. 2008-289033

(51) Int. Cl.
*G01S 19/28* (2010.01)
(52) U.S. Cl. ................................................. 342/357.67
(58) Field of Classification Search .............. 342/357.67
See application file for complete search history.

(56) References Cited

U.S. PATENT DOCUMENTS

| 4,928,107 A * | 5/1990 | Kuroda et al. ........... 342/357.67 |
| 6,720,915 B2 * | 4/2004 | Sheynblat ................ 342/357.67 |
| 2005/0253755 A1 * | 11/2005 | Gobara .................... 342/357.15 |

FOREIGN PATENT DOCUMENTS

| JP | 2003-279637 A | 10/2003 |
| JP | 2003279637 | * 10/2003 |
| WO | WO 2007078223 A1 * | 7/2007 |

* cited by examiner

*Primary Examiner* — Gregory C Issing
(74) *Attorney, Agent, or Firm* — Global IP Counselors, LLP

(57) ABSTRACT

A position calculating method includes: determining a positioning satellite used for position calculation on the basis of at least reliability of satellite orbits in a prediction target period corresponding to a position calculation point, the reliability of satellite orbits being set in long-term predicted orbit data in which satellite orbits of positioning satellites and reliability of the satellite orbits are associated for each prediction target period; and calculating a position on the basis of a positioning signal received from the determined positioning satellite.

5 Claims, 11 Drawing Sheets

| PREDICTION ERROR RANGE | PREDICTED ORBIT RELIABILITY |
|---|---|
| 0m～1m | 0 |
| 1m～2m | 1 |
| 2m～5m | 2 |
| 5m～10m | 3 |
| 10m～20m | 4 |
| 20m～40m | 5 |
| 40m～60m | 6 |
| 60m～80m | 7 |
| 80m～100m | 8 |
| 100m～200m | 9 |
| 200m～400m | 10 |
| 400m～1000m | 11 |
| 1000m～ | 12 |

FIG. 3

| SATELLITE | FIRST PERIOD | SECOND PERIOD | THIRD PERIOD | FOURTH PERIOD | FIFTH PERIOD | ... | TWENTY-EIGHTH PERIOD | RANK |
|---|---|---|---|---|---|---|---|---|
| SV1 | 0 | 0 | 0 | 0 | 1 | ... | 12 | SECOND |
| SV2 | 0 | 1 | 2 | 2 | 3 | ... | 13 | FOURTH |
| SV3 | 0 | 0 | 1 | 1 | 2 | ... | 13 | THIRD |
| SV4 | 1 | 2 | 2 | 3 | 3 | ... | 14 | FIFTH |
| SV5 | 0 | 0 | 0 | 0 | 0 | ... | 11 | FIRST |

SV2: ADDED-UP VALUE 5
SV4: ADDED-UP VALUE 8

PREDICTION TARGET PERIOD

POSITION CALCULATION POINT (Fifth Period)

| RECEPTION ENVIRONMENT | NECESSARY NUMBER OF SATELLITES |
|---|---|
| OPEN SKY ENVIRONMENT | N1 |
| MULTI-PATH ENVIRONMENT | N2 |
| WEAK FIELD ENVIRONMENT | N3 |

4731 ... 4733

$N1 \leq N2 \leq N3$

| | PREDICTION TARGET PERIOD | 2008 8/8 0:00~6:00 (FIRST PERIOD) | 2008 8/8 6:00~12:00 (SECOND PERIOD) | ... | 2008 8/14 18:00~24:00 (TWENTY-EIGHTH PERIOD) |
|---|---|---|---|---|---|
| | PARAMETER | | | | |
| SATELLITE ORBIT PARAMETER | ORBIT LENGTH RADIUS | a1 | a2 | ... | a3 |
| | ECCENTRICITY | e1 | e2 | ... | e3 |
| | ORBIT INCLINATION ANGLE | $i_0$1 | $i_0$2 | ... | $i_0$3 |
| | ... | ... | ... | ... | ... |
| CLOCK CORRECTION PARAMETER | REFERENCE TIME OF SATELLITE CLOCK | $t_c$1 | $t_c$2 | ... | $t_c$3 |
| | OFFSET OF SATELLITE CLOCK | $a_0$1 | $a_0$2 | ... | $a_0$3 |
| | DRIFT OF SATELLITE CLOCK | $a_1$1 | $a_1$2 | ... | $a_1$3 |
| | DRIFT OF SATELLITE CLOCK FREQUENCY | $a_2$1 | $a_2$2 | ... | $a_2$3 |
| RELIABILITY PARAMETER | PREDICTED ORBIT RELIABILITY | 1 | 2 | ... | 12 |

POSITION CALCULATING METHOD AND POSITION CALCULATING DEVICE

The entire disclosure of Japanese Patent Application No. 2008-289033, filed Nov. 11, 2008 is expressly incorporated by reference herein.

BACKGROUND

1. Technical Field

The present invention relates to a position calculating method and a position calculating device.

2. Related Art

As a position calculating system employing a positioning signal, a GPS (Global Positioning System) is widely known. The GPS is used for position calculating devices incorporated in a cellular phone and a car navigation apparatus. The GPS performs position calculating operation for calculating a three-dimensional coordinate value, which indicates the position of an apparatus in which the GPS is incorporated, and a clock error on the basis of information such as the positions of plural GPS satellites and pseudo distances from the GPS satellites to the apparatus.

In the position calculation, first, the GPS calculates satellite information such as the positions, speeds, and moving directions of the GPS satellites on the basis of navigational data such as almanac and ephemeris superimposed on GPS satellite signals originated from the GPS satellites. Although the almanac can be an effective clue in acquiring a satellite, in general, the almanac is not used for the position calculating operation because accuracy of a satellite orbit is low. On the other hand, the ephemeris not only can be an effective clue in acquiring a satellite but also can be used for the position calculating operation because accuracy of a satellite orbit is high. Therefore, for example, when the GPS starts position calculation without holding the ephemeris, the GPS has to acquire the ephemeris from the GPS satellite signal. As a result, first position calculating time (TTFF: Time to First Fix) increases.

The ephemeris superimposed on the GPS satellite signal includes a value of a parameter called URA Index as an index value that indicates reliability of a satellite orbit. As the URA Index is smaller, reliability of satellite information as the ephemeris is higher. Therefore, the smaller URA Index is more suitable for position calculation. JP-A-2003-279637 discloses a technique for determining satellites used for the position calculation on the basis of the URA Index included in the ephemeris.

In a technique devised in recent years, an information providing apparatus such as a server generates ephemeris effective for a long period such as one week (hereinafter referred to as "long-term predicted ephemeris (long-term predicted orbit data)") and performs position calculation using the ephemeris rather than performing the position calculation using ephemeris transmitted from a GPS satellite.

As one of methods of defining the long-term predicted ephemeris, a method of defining the long-term predicted ephemeris in a data format same as that in normal ephemeris is conceivable. Specifically, this is a method of approximating a satellite orbit using the Kepler's elliptical orbit model, which is one of approximation models of a satellite orbit, and defining the long-term predicted ephemeris according to a value of a parameter of a model formula (hereinafter referred to as "satellite orbit parameter") at that point. A satellite prediction calendar (predicted position data) including predicted positions obtained by predicting future positions of a positioning satellite in time series at an interval of predetermined time is provided from a predetermined commercial system. The approximation calculation by the Kepler's elliptical orbit model can be performed by using the satellite prediction calendar.

However, it is found that the predicted positions of the positioning satellite included in the satellite prediction calendar tend to deviate from actual positions of the positioning satellite further in the future. Therefore, when the approximation calculation by the Kepler's elliptical orbit model is performed to generate long-term predicted ephemeris, it is likely that a satellite orbit calculated by the approximation calculation deviates from an actual satellite orbit further in the future from generation date and time. Therefore, in some case, depending on a point when the position calculating apparatus performs the position calculation, the position calculating apparatus performs the position calculation using long-term predicted ephemeris having low reliability that deviates from the actual satellite orbit. This causes deterioration in accuracy of the position calculation.

SUMMARY

An advantage of some aspects of the invention is to improve accuracy of the position calculation performed by using the long-term predicted ephemeris.

According to a first aspect of the invention, there is provided a position calculating method including: determining a positioning satellite used for position calculation on the basis of at least reliability of satellite orbits in a prediction target period corresponding to a position calculation point, the reliability of satellite orbits being set in long-term predicted orbit data in which satellite orbits of positioning satellites and reliability of the satellite orbits are associated for each prediction target period; and calculating a position on the basis of a positioning signal received from the determined positioning satellite.

According to another aspect of the invention, there is provided a position calculating device including: a determining unit that determines a positioning satellite used for position calculation on the basis of at least reliability of satellite orbits in a prediction target period corresponding to a position calculation point, the reliability of satellite orbits being set in long-term predicted orbit data in which satellite orbits of positioning satellites and reliability of the satellite orbits are associated for each prediction target period; and a position calculating unit that calculates a position on the basis of a positioning signal received from the determined positioning satellite.

According to the aspects of the invention, a positioning satellite used for position calculation is determined on the basis of at least reliability of satellite orbits in a prediction target period corresponding to a position calculation point. A position is calculated on the basis of a positioning signal received from the determined positioning satellite. Since a positioning satellite having high reliability of a satellite orbit in the prediction target period corresponding to the position calculation point is preferentially used for the position calculation, it is possible to realize the position calculation with high accuracy.

A second aspect of the invention is directed to the position calculating method of the first aspect, which further includes extracting a predetermined number of positioning satellites in order from one having the highest reliability of a satellite orbit and determining a satellite used for the position calculation.

According to the second aspect of the invention, a predetermined number of positioning satellites are extracted in order from one having the highest reliability of a satellite orbit and a satellite used for the position calculation is determined. Since the positioning satellites are extracted in order from one having the highest reliability and used for the position calculation, it is possible to improve accuracy of the position calculation.

A third aspect of the invention is directed to the position calculating method of the first or second aspect, which further includes deciding positioning satellites having equivalent reliability of the satellite orbit in the prediction target period corresponding to the position calculation point. The determining includes determining, taking into account reliability of a satellite orbit in a prediction target period before or after the prediction target period corresponding to the position calculation point, whether the positioning satellites having equivalent reliability of the satellite orbit should be used for the position calculation.

According to the third aspect of the invention, positioning satellites having equivalent reliability of the satellite orbit in the prediction target period corresponding to the position calculation point are determined. It is determined by taking into account reliability of a satellite orbit in a prediction target period before or after the prediction target period corresponding to the position calculation point whether the positioning satellites having equivalent reliability of the satellite orbit should be used for the position calculation. It is impossible to decide which of the positioning satellites having equivalent reliability of the satellite orbit in the prediction target period corresponding to the position calculation point is more suitable for the position calculation. Therefore, a satellite used for the position calculation is determined by taking into account reliability of a satellite orbit in a prediction target period before or after the prediction target period corresponding to the position calculation point.

A fourth aspect of the invention is directed to the position calculating method of any one of the first to third aspects, which further includes: deciding a reception environment for the positioning signal; and determining a satellite used for the position calculation on the basis of the decided reception environment.

According to the fourth aspect of the invention, a reception environment for the positioning signal is decided. A satellite used for the position calculation is determined on the basis of the decided reception environment. This makes it possible to realize appropriate position calculation corresponding to the reception environment for the positioning signal.

A fifth aspect of the invention is directed to the position calculating method of the fourth aspect, which further includes: variably setting, according to the decided reception environment, at least a determination target period including the prediction target period corresponding to the position calculation point in the prediction target period included in the long-term predicted orbit data; and determining a satellite used for the position calculation on the basis of reliability in the determination target period.

At least a determination target period including the prediction target period corresponding to the position calculation point in the prediction target period included in the long-term predicted orbit data is variably set according to the decided reception environment. A satellite used for the position calculation is determined on the basis of reliability in the determination target period. In this case, it is possible to appropriately select a satellite used for the position calculation according to a reception environment for the positioning satellite.

BRIEF DESCRIPTION OF THE DRAWINGS

The invention will be described with reference to the accompanying drawings, wherein like numbers reference like elements.

FIG. 3 is a diagram of an example of table structure of a table for determining predicted orbit reliability.

FIG. 4 is a diagram for explaining a principle for determining satellites in use.

FIG. 11 is a diagram of an example of data structure of predicted ephemeris.

DESCRIPTION OF EXEMPLARY EMBODIMENTS

Exemplary embodiments of the invention are explained below with reference to the accompanying drawings. However, embodiments to which the invention can be applied are not limited to these embodiments.

1. System Configuration

Figure 1:
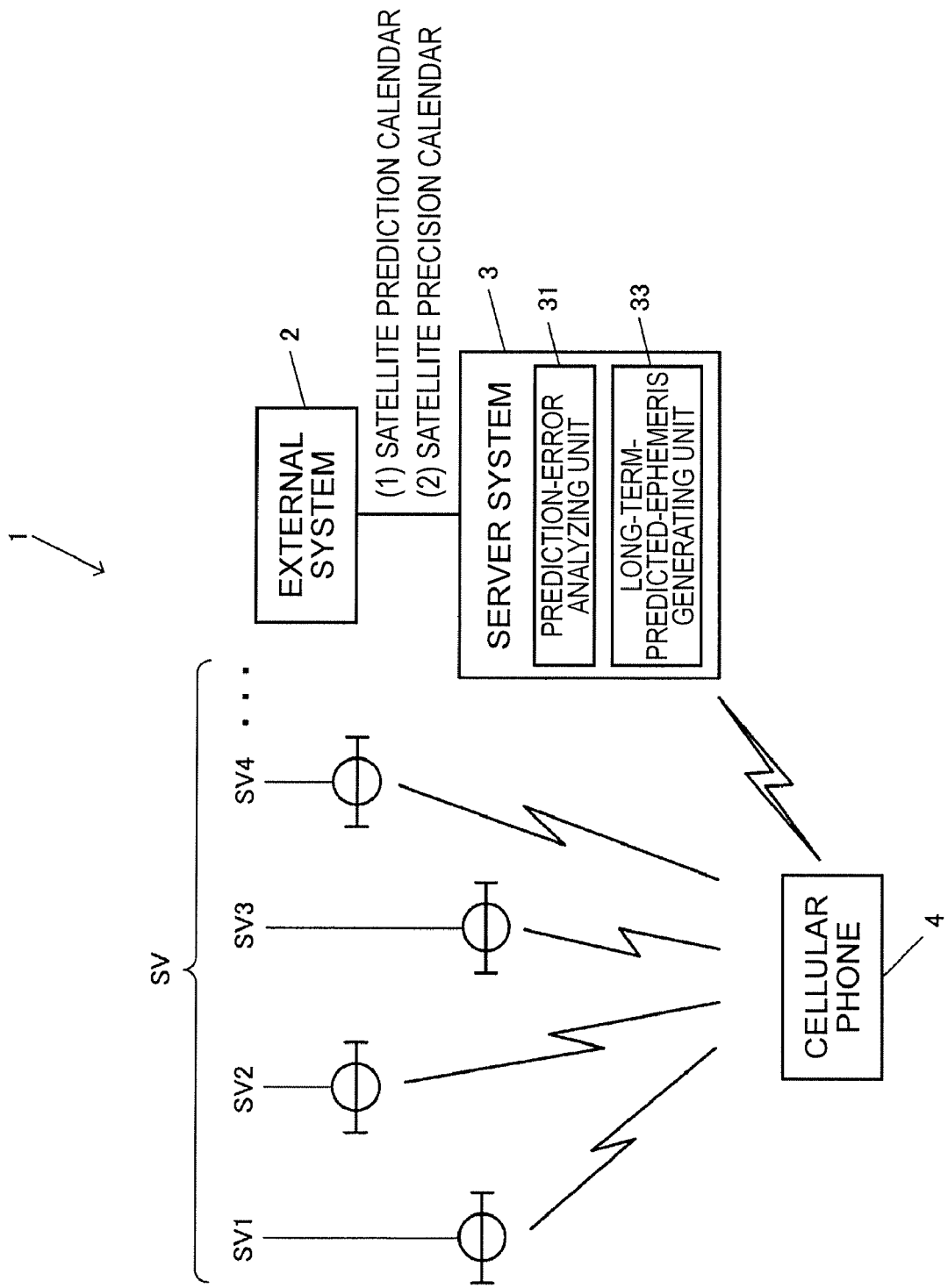
FIG. 1 is a diagram of a schematic configuration of a position calculating system.

FIG. 1 is a diagram of a schematic configuration of a position calculating system 1 according to an embodiment of the invention. The position calculating system 1 includes an external system 2, a server system 3 as one kind of an information providing apparatus, a cellular phone 4 as one kind of an electronic apparatus including a position calculating device, and plural GPS satellites SV (SV1, SV2, SV3, SV4, . . . ) as positioning satellites. After the cellular phone 4 acquires necessary data from the server system 3, position calculation can be performed by the cellular phone 4 and the GPS satellites SV. Therefore, it can be said that one position calculating system is configured by the cellular phone 4 and the GPS satellites SV. As a system on the ground side, the server system 3 and the cellular phone 4 can also be referred to as a position calculating system.

The external system 2 is a publicly-known system that periodically receives satellite signals from the GPS satellites SV, generates a satellite prediction calendar on the basis of navigational data and the like included in the satellite signals, and provides the server system 3 with the satellite prediction calendar. The satellite prediction calendar provided by the external system 2 is data of positions obtained by arranging, concerning each of the GPS satellites SV, in time series at an interval of predetermined time (e.g., 15 minutes), predicted positions obtained by predicting future positions and clock prediction errors obtained by predicting errors of atomic clocks mounted on the GPS satellites SV.

The external system 2 also provides data of facts in the past in addition to the satellite prediction calendar as future data.

Specifically, the external system 2 generates, as the data of facts in the past, a satellite precision calendar including actual positions as real positions of the GPS satellites SV and clock actual errors as real errors of the atomic clocks mounted on the GPS satellites SV and provides the server system 3 with the satellite precision calendar. Since a method of calculating the actual positions and the clock actual errors is publicly known, detailed explanation of the method is omitted. The external system 2 is equivalent to a computer system of a private or public organization that provides, for example, a satellite prediction calendar and a satellite precision calendar as business.

The server system 3 is a system including a server that acquires the satellite prediction calendar and the satellite precision calendar from the external system 2, generates predicted ephemeris of all the GPS satellites SV, which is ephemeris effective for a long period at least equal to or longer than one day, for example, one week (hereinafter referred to as "long-term predicted ephemeris" in this embodiment. Since the ephemeris is an orbit effective for a long period, the ephemeris can also be referred to as long-term predicted orbit data), and provides the ephemeris.

The cellular phone 4 is an electronic apparatus with which a user performs call, transmission and reception of mails, and the like. The cellular phone 4 includes a position calculating device having a function of calculating a position besides original functions of a cellular phone such as call and transmission and reception of mails. The cellular phone 4 transmits a request signal for the long-term predicted ephemeris to the server system 3 according to user operation and receives the long-term predicted ephemeris from the server system 3. The cellular phone 4 acquires the GPS satellites SV using the received long-term predicted ephemeris and executes position calculation based on satellite signals.

2. Principle

The server system 3 performs processing for generating the long-term predicted ephemeris using the satellite prediction calendar acquired from the external system 2. Specifically, a period for one week from generation date and time of the long-term predicted ephemeris as a reference is set as a generation target period. The generation target period is sectioned into plural periods for performing approximation and modeling of a satellite orbit (hereinafter referred to as "prediction target periods"). In this embodiment, the length of the prediction target periods is uniformly set to six hours. In other words, the generation target period of one week is sectioned into twenty-eight prediction target periods (a first prediction target period to a twenty-eighth prediction target period) for every six hours.

The server system 3 extracts predicted positions in the respective prediction target periods among predicted positions included in the satellite prediction calendar acquired from the external system 2. The server system 3 calculates, for each of the prediction target periods, a Kepler's satellite orbit model formula (hereinafter also referred to as "approximation model") in which a square sum of distances from all the extracted predicted positions is minimized. A parameter of the satellite orbit approximation model formula calculated at this point is referred to as "satellite orbit parameter". Calculation for calculating the approximation model is also referred to as "approximation calculation". A predicted satellite orbit calculated by the approximation calculation is referred to as "predicted orbit". The long-term predicted ephemeris is data in which values of satellite orbit parameters of all prediction target periods of all GPS satellites are stored (see FIGS. 10 and 11).

Predicted positions of the GPS satellites SV included in the satellite prediction calendar tend deviate from actual positions of the GPS satellites SV further in the future. Therefore, when the long-term predicted ephemeris is generated by performing the approximation calculation, it is likely that a predicted orbit calculated by the approximation calculation deviates from an actual satellite orbit further in the future from generation date and time.

In this embodiment, the server system 3 determines, concerning the prediction target periods of the GPS satellites, "predicted orbit reliability" as an index value indicating reliability of predicted orbits in the prediction target periods. The server system 3 provides the cellular phone 4 with the determined predicted orbit reliability included in the long-term predicted ephemeris as a reliability parameter. In this embodiment, the predicted orbit reliability is represented in thirteen stages "0" to "12". "0" indicates that reliability of a predicted orbit is the highest and "12" indicates that reliability of a predicted obit is the lowest. A numerical value range of the predicted orbit reliability can be set and changed as appropriate. The predicted orbit reliability may be represented in sixteen stages "0" to "15". The predicted orbit reliability is a value equivalent to "URA index" included ephemeris.

Specifically, the server system 3 includes a prediction-error analyzing unit 31 as a functional unit that analyzes a prediction error and a long-term-predicted-ephemeris generating unit 33 as a functional unit that generates the long-term predicted ephemeris. The prediction-error analyzing unit 31 calculates and analyzes, concerning each date and time (e.g., at an interval of 15 minutes) associated with data included in the satellite prediction calendar received from the external system 2, for each of the GPS satellites SV, a distance between the predicted position included in the satellite prediction calendar and the actual position included in the satellite precision calendar as a prediction error.

Figure 2:
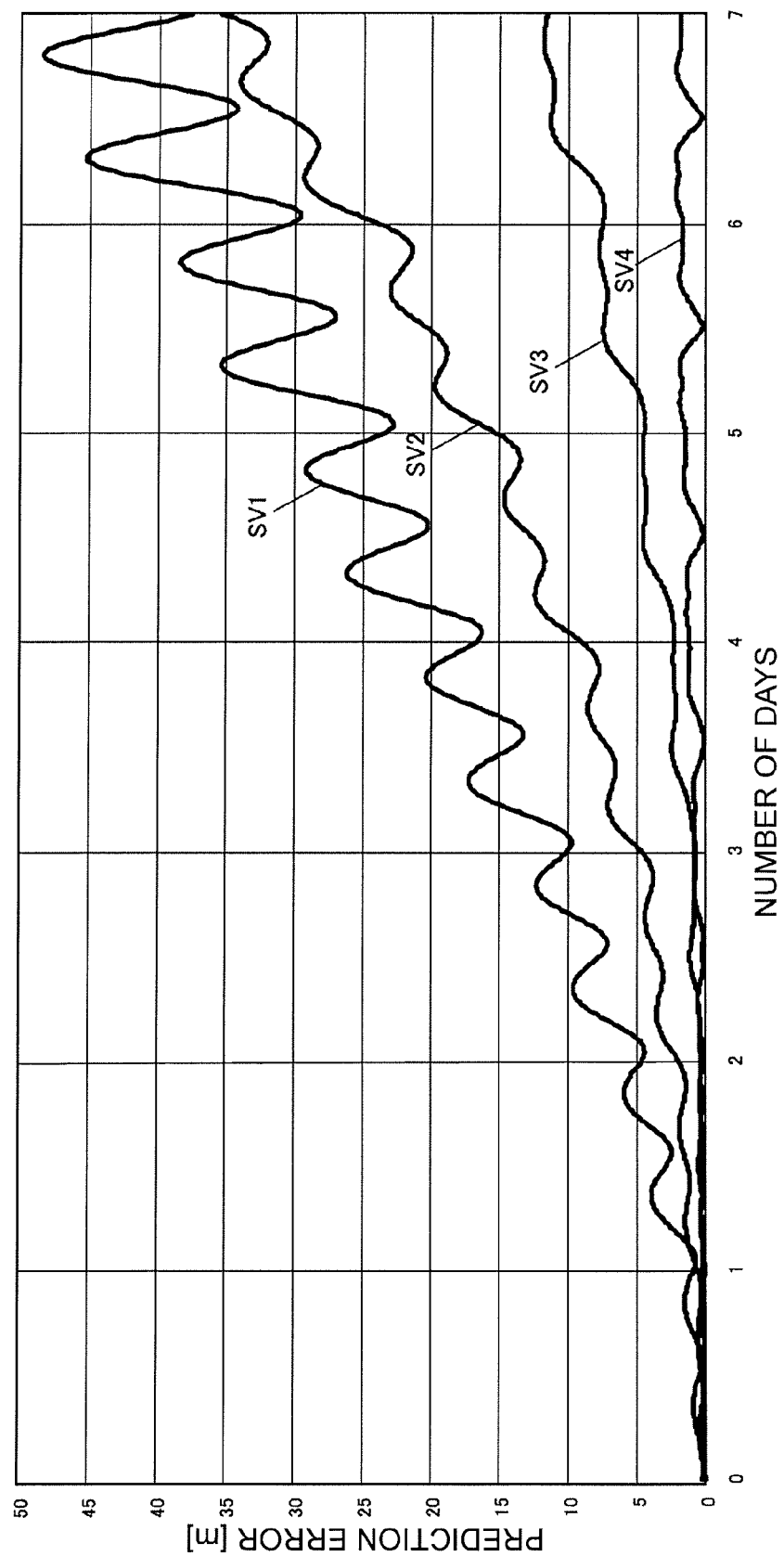
FIG. 2 is a graph of an example of a change in a prediction error.

FIG. 2 is a diagram of an example of a graph in which the prediction error is plotted. In the graph, prediction errors for one week of the four GPS satellites SV1 to SV4 as representative satellites are plotted in time series. In FIG. 2, the abscissa indicates the number of days and the ordinate indicates the prediction error. It is seen from the figure that, concerning all the GPS satellites SV, the prediction error gradually increases while oscillating according to the elapse of time. In particular, in the GPS satellite SV1, the prediction error rapidly increases while largely oscillating. Therefore, the predicted orbit reliability is set such that reliability of a predicted orbit is lower in a prediction target period further in the future from generation date and time of the long-term predicted ephemeris.

The long-term-predicted-ephemeris generating unit 33 sets the predicted orbit reliability on the basis of the prediction error calculated by the prediction-error analyzing unit 31. Specifically, the long-term-predicted-ephemeris generating unit 33 sets the prediction error on the basis of a predicted orbit reliability setting table shown in FIG. 3. In the predicted orbit reliability setting table, a prediction error range as a range in which the prediction error is included and predicted orbit reliability set when the prediction error is included in the prediction error range are stored in association with each other. The prediction error range and the predicted orbit reliability are set such that a larger value is set as the predicted orbit reliability as the prediction error is larger.

The long-term-predicted-ephemeris generating unit 33 determines, concerning each of the prediction target periods, in which prediction error range the prediction error in the prediction target period is included. The long-term-predicted-ephemeris generating unit 33 reads out predicted orbit reliability corresponding to the determined prediction error range and sets the predicted orbit reliability as the predicted orbit reliability in the prediction target period. The prediction error can be calculated concerning each date and time included in the satellite prediction calendar. However, the prediction error in each of the prediction target periods can be, for example, an average of prediction errors (an average prediction error) in all date and times in the prediction target period.

The cellular phone 4 receives the long-term predicted ephemeris, in which the predicted orbit reliability is stored, from the server system 3 and stores the long-term predicted ephemeris. The cellular phone 4 determines satellites as acquisition targets (hereinafter referred to as "acquisition target satellites") using the long-term predicted ephemeris and attempts to acquire GPS satellite signals from the acquisition target satellites. The cellular phone 4 determines satellites used for position calculation (hereinafter referred to as "satellites in use") out of satellites from which acquisition of GPS satellite signals is successful (hereinafter referred to as "acquired satellites"). The cellular phone 4 calculates the position of the cellular phone 4 on the basis of the GPS satellite signals received from the determined satellites in use.

FIG. 4 is a diagram for explaining a principle for determining satellites in use. In FIG. 4, one band in a lateral direction indicates data obtained by paying attention to one satellite in the long-term predicted ephemeris. Numbers in the band indicate predicted orbit reliabilities in respective prediction target periods. In this explanation, five satellites SV1 to SV5 are acquired and four satellites are selected and determined as satellites in use out of the five acquired satellites. A point when a position is calculated (hereinafter referred to as "position calculation point") corresponds to a fifth period among first to twenty-eighth periods.

First, concerning the prediction target period corresponding to the position calculation point, the satellites are ranked in order from one having the smallest predicted orbit reliability. In FIG. 4, the satellite "SV5" has the smallest predicted orbit reliability in the fifth period as the prediction target period corresponding to the position calculation point. Therefore, the satellite "SV5" is ranked first. The satellite "SV1" has the second smallest predicted orbit reliability. Therefore, the satellite "SV1" is ranked second. The satellite "SV3" having the third smallest predicted orbit reliability is ranked third.

A problem is that, since both the satellite "SV2" and the satellite "SV4" have the same predicted orbit reliability "3" in the fifth period, it is impossible to decide which of the satellites is more suitable for the position calculation. When the satellites having the same predicted orbit reliability are present, the satellites are ranked by taking into account predicted orbit reliability in a prediction target period before the prediction target period corresponding to the position calculation point.

Specifically, predicted orbit reliabilities in the first to fourth periods as the prediction target periods before the fifth period are added up. The satellites are ranked such that the satellite having a smaller added-up value is ranked higher. Since the satellite having the smaller added-up value has higher reliability of a predicted orbit in the past, the satellite is preferentially used for the position calculation. In this case, in the satellite "SV2", the added-up value of the predicted orbit reliabilities in the first to fourth periods is "5". In the satellite "SV4", the added-up value of the predicted orbit reliabilities in the first to fourth periods is "8". Therefore, the satellites are ranked such that the satellite "SV2" is ranked higher. As a result, the satellite "SV2" is ranked fourth and the satellite "SV4" is ranked fifth.

When the satellites are ranked, acquired satellites are selected by a number necessary for the position calculation in order from one ranked highest. The selected acquired satellites are determined as satellites in use. For example, when the number of satellites necessary for the position calculation is "4", acquired satellites ranked first to fourth are selected and determined as satellites in use. As a result, in FIG. 4, the satellites "SV5", "SV1", "SV3", and "SV2" are selected and determined as satellites in use.

3. Functional Configuration

Figure 5:
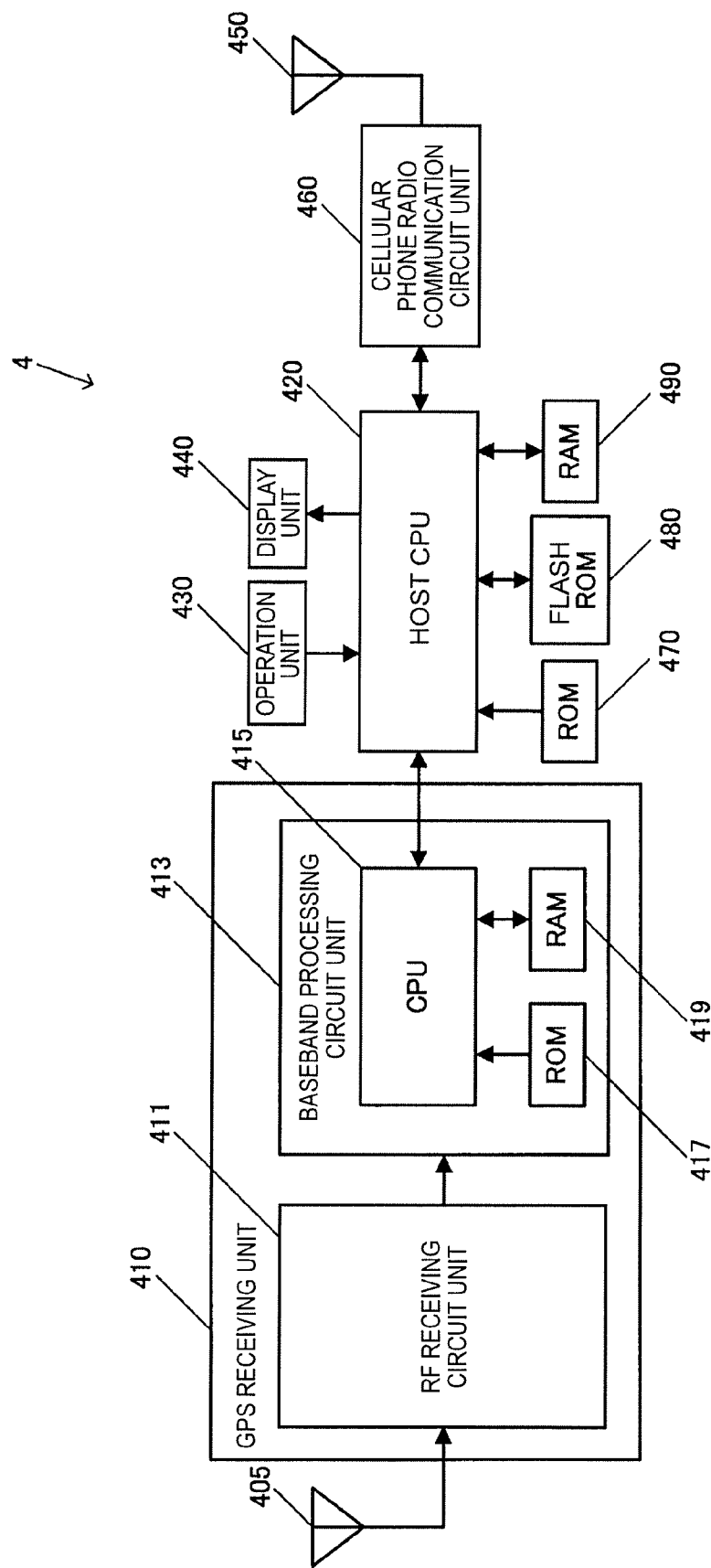
FIG. 5 is a block diagram of a functional configuration of a cellular phone.

FIG. 5 is a block diagram of a functional configuration of the cellular phone 4. The cellular phone 4 includes a GPS antenna 405, a GPS receiving unit 410, a host CPU 420, an operation unit 430, a display unit 440, a cellular phone antenna 450, a cellular phone radio communication circuit unit 460, a ROM 470, a flash ROM 480, and a RAM 490.

The GPS antenna 405 is an antenna that receives an RF (Radio Frequency) signal including a GPS satellite signal originated from the GPS satellites SV. The GPS antenna 405 outputs the received signal to the GPS receiving unit 410. The GPS satellite signal is a 1.57542 GHz communication signal modulated by a direct spread spectrum system with a PRN (Pseudo Random Noise) code that is one kind of a spread code different for each satellite. The PRN code is a pseudo random noise code at a repetition period 1 ms with code length 1023 chips set as one PN frame.

The GPS receiving unit 410 is a position calculating circuit that performs position calculation on the basis of the signal output from the GPS antenna 405 and is a functional block equivalent to a so-called GPS receiver. The GPS receiving unit 410 includes an RF (Radio Frequency) receiving circuit unit 411 and a baseband processing circuit unit 413. The RF receiving circuit unit 411 and the baseband processing circuit unit 413 can be manufactured as separate LSIs (Large Scale Integrations) or can be manufactured as one chip.

The RF receiving circuit unit 411 is a processing circuit block for an RF signal. The RF receiving circuit unit 411 divides or multiplies a predetermined local oscillation signal to generate an oscillation signal for RF signal multiplication. The RF receiving circuit unit 411 multiplies the RF signal output from the GPS antenna 405 with the generated oscillation signal to down-convert the RF signal into a signal having an intermediate frequency (hereinafter referred to as "IF (Intermediate Frequency) signal"). After, for example, amplifying the IF signal, the RF receiving circuit unit 411 converts the IF signal into a digital signal with an A/D (Analog Digital) converter and outputs the digital signal to the baseband processing circuit unit 413.

The baseband processing circuit unit 413 is a circuit unit that applies correlation processing or the like to the IF signal output from the RF receiving circuit unit 411 and acquires and extracts the GPS satellite signal. The baseband processing circuit unit 413 includes a CPU 415 as a processor and a ROM 417 and a RAM 419 as memories. The CPU 415 acquires and extracts the GPS satellite signal using the long-term predicted ephemeris data acquired by the host CPU 420 from the server system 3.

The host CPU 420 is a processor that collectively controls the units of the cellular phone 4 according to various programs such as a position calculating program and a system program stored in the ROM 470. The host CPU 420 performs the position calculation on the basis of the GPS satellite signal acquired and extracted by the baseband processing circuit unit 413. The host CPU 420 causes the display unit 440 to display a navigation screen in which a calculated position calculated by the position calculation is plotted.

The operation unit 430 is an input device including a touch panel and button switches. The operation unit 430 outputs a signal of a depressed icon or button to the host CPU 420. Various kinds of instruction input such as a call request, a mail transmission and reception request, and a GPS start request are performed according to the operation of the operation unit 430.

The display unit 440 is a display device including an LCD (Liquid Crystal Display). The display unit 440 performs various kinds of display based on display signals input from the host CPU 420. A navigation screen, time information, and the like are displayed on the display unit 440.

The cellular phone antenna 450 is an antenna that performs transmission and reception of a cellular phone radio signal between the cellular phone 4 and a radio base station set by a communication service carrier of the cellular phone 4.

The cellular phone radio communication circuit unit 460 is a communication circuit unit for a cellular phone including an RF conversion circuit and a baseband processing circuit. The cellular phone radio communication circuit unit 460 performs modulation, demodulation, and the like of the cellular phone radio signal to realize call, transmission and reception of mails, and the like.

The ROM 470 is a read-only nonvolatile storage device. The ROM 470 has stored therein various computer programs such as a system program for the host CPU 420 to control the cellular phone 4, a position calculating program for realizing position calculation, and a navigation program for realizing a navigation function, data, and the like.

The flash ROM 480 is a read-only nonvolatile storage device. Like the ROM 470, the flash ROM 480 has stored there in various computer programs for the host CPU 420 to control the cellular phone 4, data, and the like. The data stored in the flash ROM 480 is not lost even if a power supply for the cellular phone 4 is disconnected.

The RAM 490 is a random access volatile storage device. The RAM 490 forms a work area for temporarily storing the system program, the position calculating program, various processing programs, in-process data of various kinds of processing, a processing result, and the like.

4. Data Structure

Figure 6:
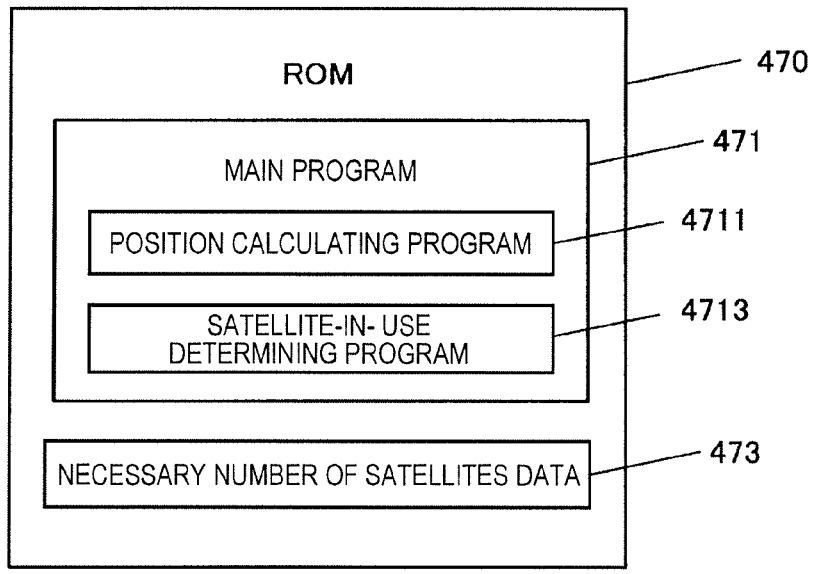
FIG. 6 is a diagram of an example of data stored in a ROM of the cellular phone.

FIG. 6 is a diagram of an example of data stored in the ROM 470. In the ROM 470, a main program 471 read out by the host CPU 420 and executed as main processing (see FIG. 12) and necessary number of satellites data 473 are stored. In the main program 471, a position calculating program 4711 executed as position calculation processing (see FIG. 13) and a satellite-in-use determining program 4713 executed as satellite-in-use determination processing (see FIG. 14) are included as sub-routines.

The main processing is processing by the host CPU 420 for performing, besides processing for call and transmission and reception of mails as original functions of the cellular phone 4, processing for acquiring long-term predicted ephemeris data 481 from the server system 3, processing for calculating the position of the cellular phone 4, and the like.

The position calculation processing is processing by the host CPU 420 for causing the baseband processing circuit unit 413 to acquire GPS satellite signals from the GPS satellites SV using the long-term predicted ephemeris data 481 received from the server system 3, calculating the position of the cellular phone 4 on the basis of the acquired GPS satellite signal, and outputting the position of the cellular phone 4.

The satellite-in-use determination processing is processing by the host CPU 420 for determining a reception environment for GPS satellite signals and selecting and determining a satellite used for position calculation out of acquired satellites according to the determined reception environment. These kinds of processing are explained in detail later with reference to flowcharts.

Figures 9, 10:
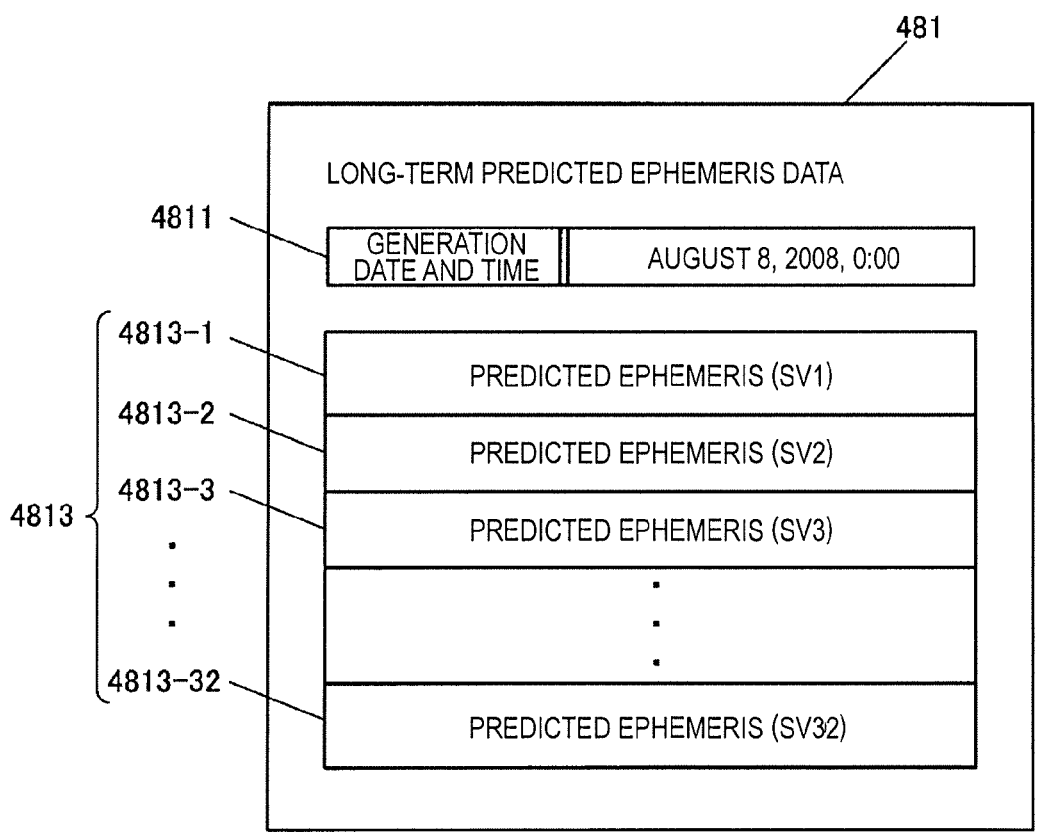
FIG. 9 is a diagram of an example of data structure of necessary number of satellites data.
FIG. 10 is a diagram of an example of data structure of long-term predicted ephemeris data.

FIG. 9 is a diagram of an example of data structure of the necessary number of satellites data 473. In the necessary number of satellites data 473, a reception environment 4731 for GPS satellite signals and a necessary number of satellites 4733 as the number of satellites necessary for position calculation in the reception environment are stored in association with each other. When the reception environment for GPS satellite signals is an "open sky environment", the necessary number of satellites is "N1". When the reception environment for GPS satellite signals is a "multi-path environment", the necessary number of satellites is "N2". When the reception environment for GPS satellite signals is a "weak field environment", the necessary number of satellites is "N3". Note that a relation among N1, N2, and N3 is $N1 \leq N2 \leq N3$.

Figure 7:
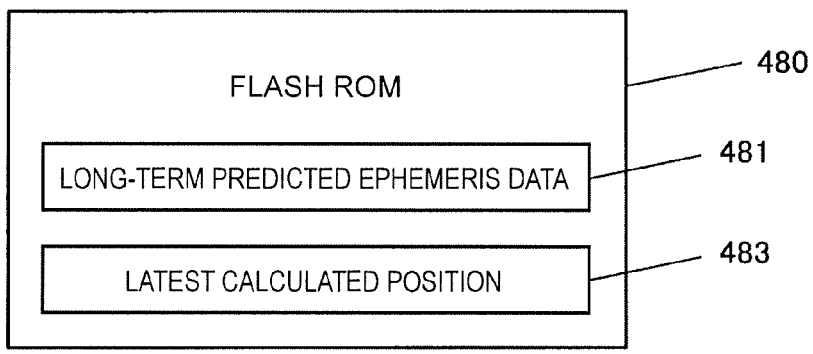
FIG. 7 is a diagram of an example of data stored in a flash ROM of the cellular phone.

FIG. 7 is a diagram of an example of data stored in the flash ROM 480. In the flash ROM 480, the long-term predicted ephemeris data 481 received from the server system 3 and a latest calculated position 483 as a position obtained by latest position calculation are stored.

FIG. 10 is a diagram of an example of data structure of the long-term predicted ephemeris data 481. In the long-term predicted ephemeris data 481, generation date and time 4811 of the long-term predicted ephemeris data and predicted ephemeris 4813 (4813-1 to 4813-32) of GPS satellites SV1 to SV32 are stored in association with each other.

FIG. 11 is a diagram of an example of data structure of the predicted ephemeris 4813. In the predicted ephemeris 4813 (4813-1, 4813-2, . . . , and 4813-32), values of Kepler's satellite orbit parameters such as an orbit length radius, eccentricity, and an orbit inclination angle, values of clock correction parameters such as reference time of a satellite clock, offset of the satellite clock, drift of the satellite clock, and drift of a satellite clock frequency, and predicted orbit reliability as a reliability parameter are stored for each of prediction target periods.

The long-term-predicted-ephemeris generating unit 33 of the server system 3 calculates, concerning the GPS satellites SV, values of the satellite orbit parameters, the clock correction parameters, and the reliability parameter for each of the prediction target periods and generates the predicted ephemeris 4813. The long-term-predicted-ephemeris generating unit 33 collectively associates the predicted ephemeris 4813 generated concerning all the GPS satellites SV with the generation date and time 4811 to generate the long-term predicted ephemeris data 481. The long-term-predicted-ephemeris generating unit 33 transmits and provides the long-term predicted ephemeris data 481 to the cellular phone 4 in response to a request from the cellular phone 4.

On the other hand, the host CPU 420 of the cellular phone 4 transmits a request signal for the long-term predicted ephemeris data 481 to the server system 3 in the long-term predicted ephemeris acquisition processing of the main processing. The host CPU 420 receives the long-term predicted ephemeris data 481 from the server system 3 and causes the flash ROM 480 to store the long-term predicted ephemeris data 481.

Figure 8:
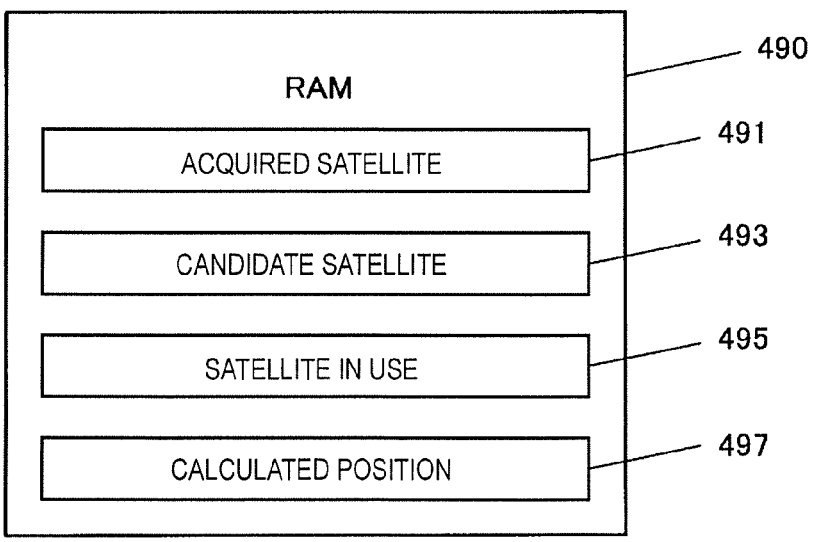
FIG. 8 is a diagram of an example of data stored in a RAM of the cellular phone.

FIG. 8 is a diagram of an example of data stored in the RAM 490. In the RAM 490, acquired satellites 491, candidate satellites 493 as satellites selected as candidates of satellites in use out of acquired satellites, satellites in use 495 determined as satellites used for position calculation out of candidate satellites 493, and a calculated position 497 as a position calculated by performing the position calculation on the basis of GPS satellite signals received from the satellites in use 495 are stored. These data are updated by the host CPU 420 in the position calculation processing.

5. Flow of Processing

Figure 12:
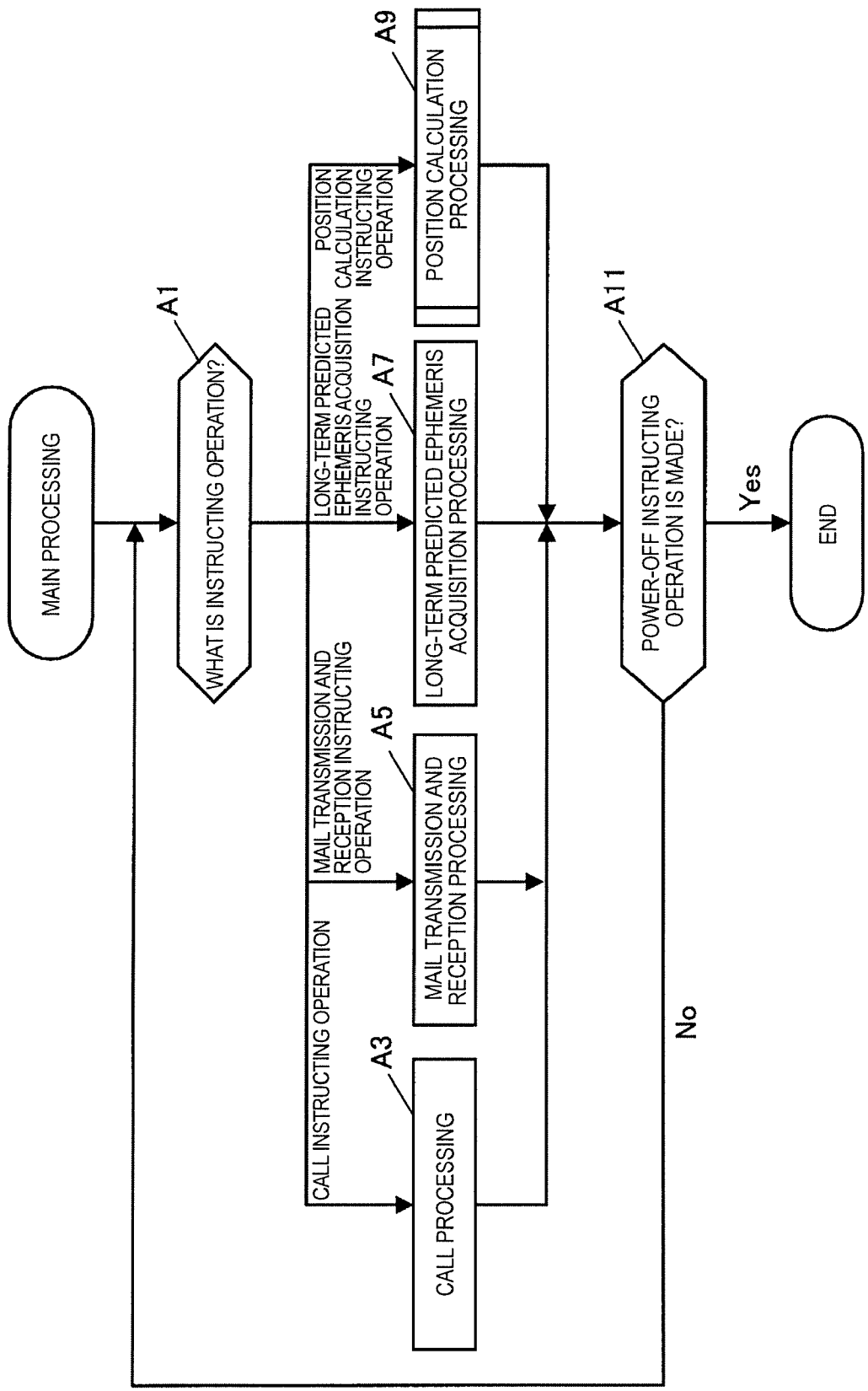
FIG. 12 is a flowchart of a flow of main processing.

FIG. 12 is a flowchart of a flow of main processing executed by the cellular phone 4 when the main program 471 stored in the ROM 470 is read out and executed by the host CPU 420.

The main processing is processing started to be executed by the host CPU 420 when the host CPU 420 detects that power-on operation is performed by the user via the operation unit 430. Although not specifically explained, during the execution of the main processing, reception of an RF signal by the GPS antenna 405 and down-convert of the RF signal into an IF signal by the RF receiving circuit unit 411 are performed. The IF signal is output to the baseband processing circuit unit 413 at any time.

First, the host CPU 420 determines what instructing operation performed via the operation unit 430 is (step A1). When the host CPU 420 determines that the instructing operation is call instructing operation (step A1; call instructing operation), the host CPU 420 performs call processing (step A3). Specifically, the host CPU 420 causes the cellular phone radio communication circuit unit 460 to perform base station communication between the cellular phone 4 and the radio base station and realizes call between the cellular phone 4 and another cellular phone.

When the host CPU 420 determines in step A1 that the instructing operation is a mail transmission and reception instructing operation (step A1; mail transmission and reception instructing operation), the host CPU 420 performs mail transmission and reception processing (step A5). Specifically, the host CPU 420 causes the cellular phone radio communication circuit unit 460 to perform the base station communication and realizes transmission and reception of mails between the cellular phone 4 and another cellular phone.

When the host CPU 420 determines in step A1 that the instructing operation is a long-term predicted ephemeris acquisition instructing operation (step A1; long-term predicted ephemeris acquisition instructing operation), the host CPU 420 performs long-term predicted ephemeris acquisition processing (step A7). Specifically, the host CPU 420 transmits a request signal for the long-term predicted ephemeris data 481 to the server system 3. The host CPU 420 receives the long-term predicted ephemeris data 481 from the server system 3 and causes the flash ROM 480 to store the long-term predicted ephemeris data 481.

When the host CPU 420 determines in step A1 that the instructing operation is position calculation instructing operation (step A1; position calculation instructing operation), the host CPU 420 reads out and executes the position calculating program 4711 stored in the ROM 470 to perform position calculation processing (step A9).

Figure 13:
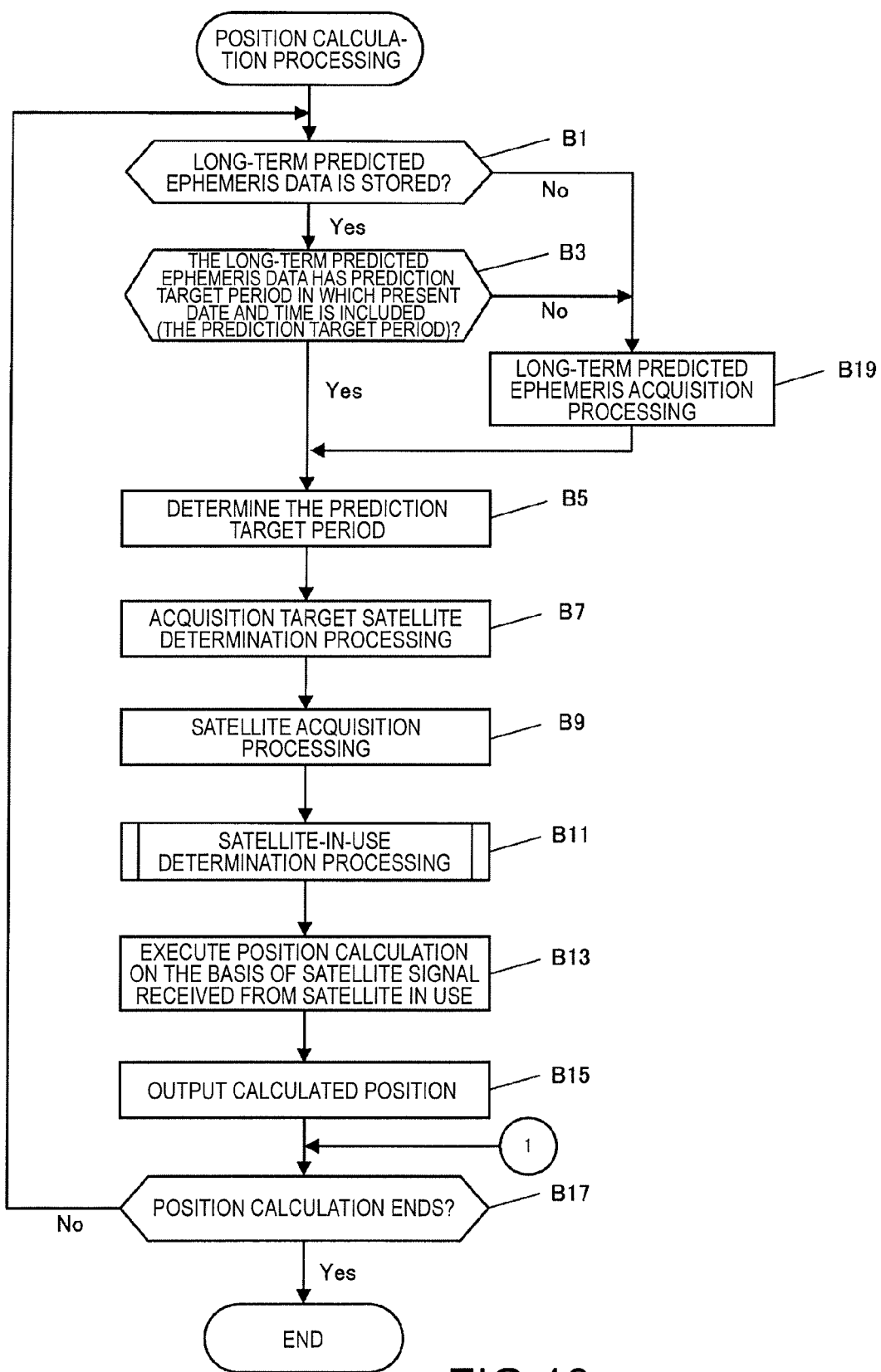
FIG. 13 is a flowchart of a flow of position calculation processing.

FIG. 13 is a flowchart of a flow of the position calculation processing.

First, the host CPU 420 determines whether the long-term predicted ephemeris data 481 is stored in the flash ROM 480 (step S1). When the host CPU 420 determines that the long-term predicted ephemeris data 481 is stored in the flash ROM 480 (step B1; Yes), the host CPU 420 determines whether the long-term predicted ephemeris data 481 is data having a prediction target period including the present date and time (position calculation date and time) (hereinafter referred to as "the prediction target period") (step B3).

When the host CPU 420 determines that the long-term predicted ephemeris data 481 is the data having the prediction target period (step B3; Yes), the host CPU 420 determines the prediction target period with reference to the long-term predicted ephemeris data 481 (step B5).

Thereafter, the host CPU 420 performs acquisition target satellite determination processing (step B7). More specifically, the host CPU 420 determines the GPS satellites SV located in the sky of the latest calculated position 483 stored in the flash ROM 480 at the present date and time using the long-term predicted ephemeris data 481 stored in the flash ROM 480 and sets the GPS satellites SV as acquisition target satellites.

Subsequently, the host CPU 420 performs satellite signal acquisition processing and causes the CPU 415 of the baseband processing circuit unit 413 to perform correlation operation in a frequency direction and a phase direction. In this way, the host CPU 420 attempts to acquire GPS satellite signals from the acquisition target satellites determined in step B7 (step B9). The host CPU 420 causes the RAM 490 to store, as the acquired satellites 491, the satellites from which acquisition of the GPS satellite signals is successful.

After performing the satellite signal acquisition processing, the host CPU 420 reads out and executes the satellite-in-use determining program 4713 stored in the ROM 470 to perform satellite-in-use determination processing (step B11).

Figure 14:
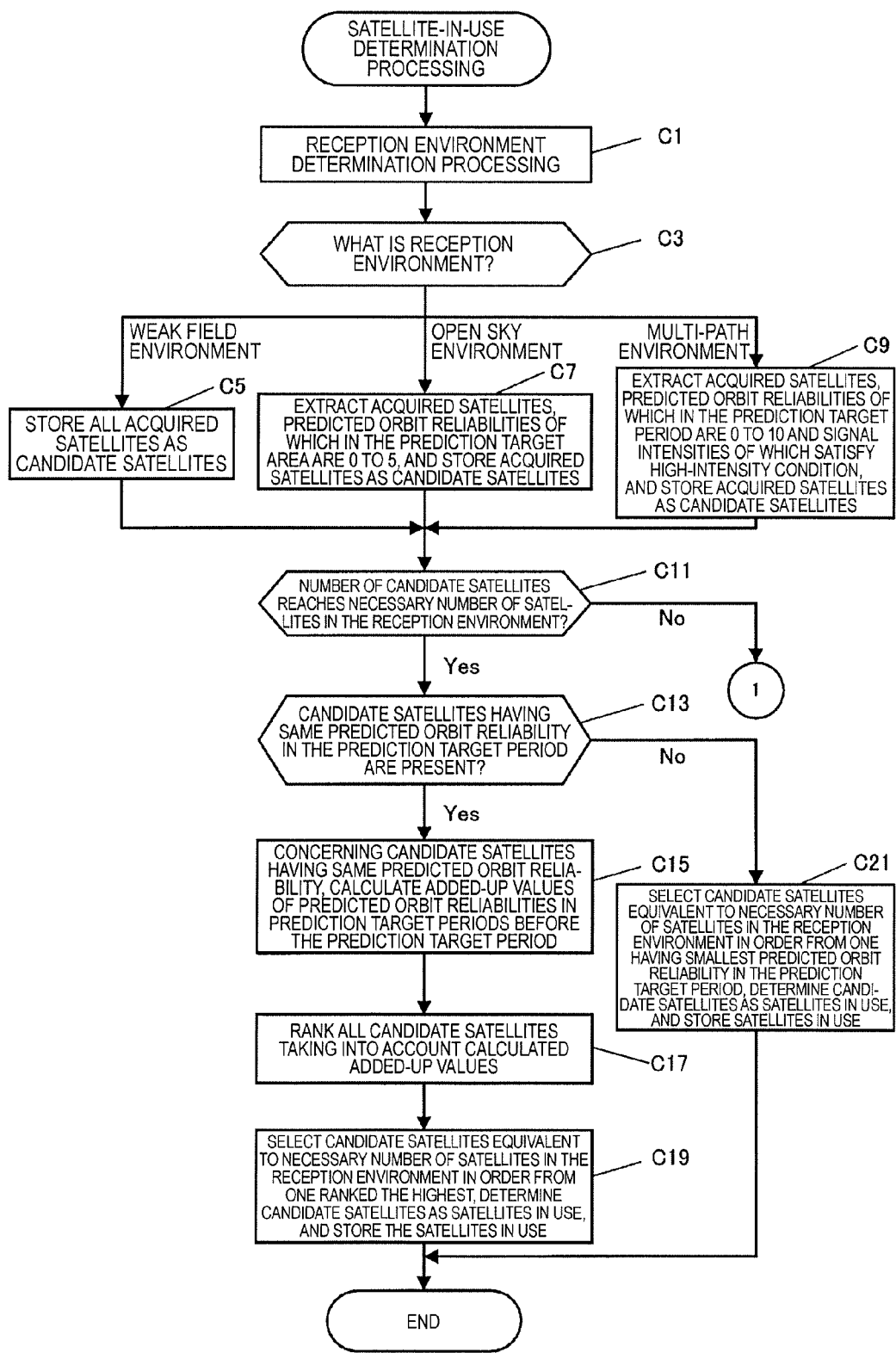
FIG. 14 is a flowchart of a flow of satellite-in-use determination processing.

FIG. 14 is a flowchart of a flow of the satellite-in-use determination processing.

First, the host CPU 420 performs reception environment determination processing (step C1). In the reception environment determination processing, the host CPU 420 determines a reception environment on the basis of signal intensities of the GPS satellite signals received from the acquired satellites 491 and arrangement in the sky of the acquired satellites 491.

Specifically, for example, when the signal intensities of the received GPS satellite signals are larger than a first threshold (e.g., "−130 dBm") concerning all the acquired satellites 491, the host CPU 420 determines that the reception environment is an open sky environment. When satellites having signal intensities smaller than the first threshold are present and an average of signal intensities of the GPS satellite signals received from satellites having low elevation angles (e.g., "equal to or smaller than 60 degrees") is smaller than a second threshold (e.g., "−140 dBm"), the host CPU 420 determines that the reception environment is a multi-path environment. Otherwise, the host CPU 420 determines that the reception environment is a weak field environment.

As a method of determining the reception environment, other publicly-known methods can be applied. For example, JP-A-2008-26134 discloses an environment determining method for determining which of the first to ninth environments the reception environment is. The reception environment can be determined by using this method.

When the host CPU 420 determines that the reception environment is the "weak field environment" (step C3; weak field environment), the host CPU 420 causes the RAM 490 to store all the acquired satellites 491 as the candidate satellites 493 (step C5).

When the host CPU 420 determines that the reception environment is the "open sky environment" (step C3; open sky environment), the host CPU 420 extracts the acquired satellites 491, predicted orbit reliabilities of which in the prediction target period are "0 to 5", with reference to the long-term predicted ephemeris data 481 and causes the RAM 490 to store the acquired satellites 491 as the candidate satellites 493 (step C7).

When the host CPU 420 determines that the reception environment is the "multi-path environment" (step C3; multi-path environment), the host CPU 420 extracts the acquired satellites 491, predicted orbit reliabilities of which in the prediction target period are "0 to 10" and signal intensities of acquired GPS satellite signals of which satisfy a predetermined high-intensity condition, with reference to the long-term predicted ephemeris data 481 and causes the RAM 490 to store the acquired satellites 491 as the candidate satellites 493 (step C9). The high-intensity condition is, for example, a condition that signal intensities of the acquired satellites 491 are larger than "−130 dBm".

After determining the candidate satellites 493 in any one of steps C5 to C9, the host CPU 420 determines, with reference to the necessary number of satellites data 473 stored in the ROM 470, whether the number of candidate satellites 493 reaches the necessary number of satellites 4733 in the reception environment 4731 (step C11). When the host CPU 420 determines that the number of candidate satellites 493 does not reach the necessary number of satellites 4733 (step C11; No), the host CPU 420 shifts the processing to step B17.

When the host CPU 420 determines that the number of candidate satellites 493 reaches the necessary number of satellites 4733 (step C11; Yes), the host CPU 420 determines whether the candidate satellites 493 having the same predicted orbit reliability in the prediction target period is present (step C13). When the host CPU 420 determines that such candidate satellites 493 are present (step C13; Yes), the host CPU 420 adds up, concerning the candidate satellites 493 having the same predicted orbit reliability, predicted orbit reliabilities in prediction target periods before the prediction target period (step C15).

The host CPU 420 ranks all the candidate satellites 493 taking into account added-up values calculated in step C15 (step C17). Specifically, the host CPU 420 ranks the candidate satellites 493 such that the satellite having small predicted orbit reliability in the prediction target period is ranked higher. The host CPU 420 ranks the satellites having the same predicted orbit reliability such that the satellite having a smaller added-up value calculated in step C15 is ranked higher.

The host CPU 420 selects the candidate satellites 493 equivalent to the necessary number of satellites 4733 in the reception environment in order from one ranked highest in step C17, determines the candidate satellites 493 as the satellites in use 495, and causes the RAM 490 to store the satellites in use 495 (step C19). The host CPU 420 ends the satellite-in-use determination processing.

When the host CPU 420 determines in step C13 that the candidate satellites 493 having the same predicted orbit reliability are not present (step C13; No), the host CPU 420 selects the candidate satellites 493 equivalent to the necessary number of satellites 4733 in the reception environment in order from one having the smallest predicted orbit reliability in the prediction target period, determines the candidate satellites 493 as the satellites in use 495, and causes the RAM 490 to store the satellites in use 495 (step C21). The host CPU 420 ends the satellite-in-use determination processing.

Referring back to the position calculation processing shown in FIG. 13, after performing the satellite-in-use determination processing, the host CPU 420 executes position calculation on the basis of GPS satellite signals received from the satellites in use 495 (step B13). Specifically, the host CPU 420 calculates satellite positions and satellite clock correction amounts of the satellites in use 495 using satellite orbit parameter values and clock correction parameter values of the satellites in use 495 in the prediction target period stored in the long-term predicted ephemeris data 481 of the flash ROM 480.

The host CPU 420 calculates pseudo distances between the cellular phone 4 and the satellites in use 495 using code phases of the GPS satellite signals of the satellites in use 495 acquired in step B9. The host CPU 420 performs, for example, position converging operation employing the method of least squares using the calculated satellite positions, satellite clock correction amounts, and pseudo distances. The host CPU 420 causes the RAM 490 to store, as the calculated position 497, a position obtained by the position converging operation.

Subsequently, the host CPU 420 outputs the calculated position 497 stored in the RAM 490 to the display unit 440 and causes the display unit 440 to display a navigation screen (step B15). The host CPU 420 determines whether an end instruction for the position calculation is made via the operation unit 430 (step B17). When the host CPU 420 determines that the end instruction for the position calculation is not made (step B17; No), the host CPU 420 returns to step B1. When the host CPU 420 determines that the end instruction for the position calculation is made (step B17; Yes), the host CPU 420 ends the position calculation processing.

On the other hand, when the host CPU 420 determines in step B1 that the long-term predicted ephemeris data 481 is not stored (step B1; No) or when the host CPU 420 determines in step B3 that the long-term predicted ephemeris data 481 is the data not having the prediction target period (step B3; No), the host CPU 420 performs long-term predicted ephemeris acquisition processing, acquires the long-term predicted ephemeris data 481 from the server system 3, and causes the flash ROM 480 to store the long-term predicted ephemeris data 481 (step B19). The host CPU 420 shifts the processing to step B5.

Referring back to the main processing shown in FIG. 12, after performing the processing in any one of steps A3 to A9, the host CPU 420 determines whether power-off instructing operation is made by the user via the operation unit 430 (step A11). When the host CPU 420 determines that the power-off instructing operation is not made (step A11; No), the host CPU 420 returns to step A1. When the host CPU 420 determines that the power-off instructing operation is made (step A11; Yes), the host CPU 420 ends the main processing.

6. Actions and Effects

According to this embodiment, GPS satellites used for position calculation are determined on the basis of predicted orbit reliability in a prediction target period corresponding to a position calculation point set in long-term predicted ephemeris in which parameter values of satellite orbits of GPS satellites and predicted orbit reliability as index values indicating reliability of the satellite orbits are associated with each other for each of prediction target periods. A position is calculated on the basis of GPS satellite signals received from the determined GPS satellites.

More specifically, the GPS satellites are ranked in order from one having the smallest predicted orbit reliability in the prediction target period corresponding to the position calculation point. In ranking the GPS satellites, concerning the GPS satellites having the same predicted orbit reliability, predicted orbit reliabilities in all prediction target periods before the prediction target period are added up and the GPS satellites are ranked such that the GPS satellite having a smaller added-up value is ranked higher. The GPS satellites in a number necessary for position calculation are selected in order from one ranked highest and determined as satellites in use. The position calculation is performed on the basis of GPS satellite signals received from the satellites in use. Consequently, the GPS satellites having high reliability of predicted orbits are preferentially used for the position calculation. Therefore, it is possible to realize the position calculation with high accuracy.

In this embodiment, a reception environment for GPS satellite signals is determined. A method of selecting satellites in use is changed according to the determined reception environment. Specifically, in the weak field environment, since it is difficult to acquire satellites and it is desired to use even satellites having low reliability of predicted orbits for the position calculation, satellites in use are selected out of all acquired satellites. On the other hand, in the open sky environment, since it is easy to acquire satellites and it is desired to preferentially use satellites having high reliability of predicted orbits for the position calculation, satellites in use are selected out of acquired satellites, predicted orbit reliabilities of which are "0" to "5". In the multi-path environment, since it is likely that satellites affected by a multi-path are included, satellites in use are selected out of acquired satellites, signal intensities of which satisfy a predetermined high-intensity condition, among acquired satellites, predicted orbit reliabilities of which are "0" to "10". With such a configuration, it is possible to appropriately select satellites in use according to the reception environment. Accuracy of the position calculation is improved.

7. Modifications

7-1. Position Calculating System

In the embodiment explained above, the position calculating system 1 including the server system 3 and the cellular phone 4 is explained as the example. However, a position calculating system to which the invention can be applied is not limited to this. For example, instead of the cellular phone 4, the invention can be applied to electronic apparatuses such as a notebook personal computer, a PDA (Personal Digital Assistant), and a car navigation apparatus including position calculating devices.

7-2. Satellite Position Calculating System

In the embodiment explained above, the GPS is explained as the example of the satellite position calculating system. However, the satellite position calculating system may be other satellite position calculating system such as the WAAS (Wide Area Augmentation System), the QZSS (Quasi Zenith Satellite System), the GLONASS (GLObal Navigation Satellite System), and the GALILEO.

7-3. Ranking of Satellites in Use

In the embodiment explained above, when acquired satellites having the same predicted orbit reliability in a prediction target period corresponding to the position calculation point (the prediction target period) are present, predicted orbit reliabilities of all prediction target periods before the prediction target period are added up and the acquired satellites are ranked by taking into account added-up values of the predicted orbit reliabilities. However, the acquired satellites may be ranked by taking into account averages or maximums instead of the added-up values.

Predicted orbit reliabilities in prediction target periods after the prediction target period rather than the prediction target periods before the prediction target period may be added up or averaged. The acquired satellites may be ranked by taking into account added-up values or averages of the predicted orbit reliabilities. The acquired satellites may be ranked by taking into account added-up values or averages of predicted orbit reliabilities in all the prediction target periods. In any case, the satellites are ranked such that the satellite having a smaller added-up value or average is ranked higher.

7-4. Setting of a Determination Target Period

In the embodiment explained above, satellites in use are determined on the basis of predicted orbit reliability of a prediction target period corresponding to the position calculation point (the prediction target period). However, satellites in use may be determined on the basis of predicted orbit reliabilities in predetermined determination target periods including the prediction target period. For example, two prediction target periods including the prediction target periods (three prediction target periods in total) are set as determination target periods for each of acquired satellites. Predicted orbit reliabilities of the set determination target periods are added up or averaged. The acquired satellites are selected in order from one having smallest added-up value or average of the predicted orbit reliabilities and determined as satellites in use.

The determination target periods may be set variable according to a reception environment for GPS satellite signals. In the weak field environment, the position calculation is required to be performed by using orbit information having high reliability compared with the other reception environments. Therefore, it is preferable to set the determination target periods wider than those in the other reception environments. For example, in the weak field environment, all prediction target periods before the prediction target period are set as the determination target periods. However, in the multi-path environment and the open sky environment, the prediction target period and a prediction target period immediately preceding the prediction target period are set as the determination target periods.

Future periods may be included in the determination target periods. For example, in the weak field environment, all prediction target periods after the prediction target period are set as the determination target periods. In the multi-path environment and the open sky environment, the prediction target period and a prediction target period immediately after the prediction target period are set as the determination target periods.

7-5. Generation Target Period

In the embodiment explained above, a period for one week from generation date and time of the long-term predicted ephemeris as a reference is set as a generation target period to generate the long-term predicted ephemeris. However, the generation target period may be a period longer than one week (e.g., two weeks) or may be a period shorter than one week (e.g., three days). In general, an effective period of ephemeris as navigational data transmitted from the GPS satellites SV is about four hours. However, the long-term predicted ephemeris only has to have an effective period at least longer than that of the ephemeris as the navigational data transmitted from the GPS satellites SV. It is preferable that the effective period is equal to or longer than one day.

7-6. Prediction Target Period

In the embodiment explained above, the length of the prediction target period is set to six hours. However, the length of the prediction target period is not limited to this and may be set to four hours, eight hours, and the like. It goes without saying that the length of the prediction target period can be set as appropriate.

What is claimed is:

1. A position calculating method for positioning of a positioning device by a satellite signal from a satellite, the positioning device having a central processing unit (CPU), the position calculating method comprising:

determining by the CPU a positioning satellite which is used for position calculation on the basis of at least reliability of satellite orbits in a prediction target period corresponding to a position calculation point, the reliability of satellite orbits being set in long-term predicted orbit data in which satellite orbits of positioning satellites and reliability of the satellite orbits are associated for each prediction target period;

calculating by the CPU a position on the basis of a positioning signal received from the determined positioning satellite; and deciding by the CPU positioning satellites having equivalent reliability of the satellite orbit in the prediction target period corresponding to the position calculation point, the determining including determining, taking into account reliability of a satellite orbit in a prediction target period before or after the prediction target period corresponding to the position calculation point, whether the positioning satellites having equivalent reliability of the satellite orbit should be used for the position calculation.

2. The position calculating method according to claim 1, further comprising extracting by the CPU a predetermined number of positioning satellites in order from one having highest reliability of a satellite orbit and determining a satellite used for the position calculation.

3. The position calculating method according to claim 1, further comprising deciding by the CPU a reception environment for the positioning signal; and determining by the CPU a satellite used for the position calculation on the basis of the decided reception environment.

4. The position calculating method according to claim 3, further comprising variably setting by the CPU, according to the decided reception environment, at least a determination target period including the prediction target period corresponding to the position calculation point in the prediction target period included in the long-term predicted orbit data; and determining by the CPU a satellite which is used for the position calculation on the basis of reliability in the determination target period.

5. A position calculating device comprising:

a determining unit that determines a positioning satellite which is used for position calculation on the basis of at least reliability of satellite orbits in a prediction target period corresponding to a position calculation point, the reliability of satellite orbits being set in long-term predicted orbit data in which satellite orbits of positioning satellites and reliability of the satellite orbits are associated for each prediction target period; and a position calculating unit that calculates a position on the basis of a positioning signal received from the determined positioning satellite a deciding unit that decides positioning satellites having equivalent reliability of the satellite orbit in the prediction target period corresponding to the position calculation point, the determining unit that determines, taking into account reliability of a satellite orbit in a prediction target period before or after the prediction target period corresponding to the position calculation point, whether the positioning satellites having equivalent reliability of the satellite orbit should be used for the position calculation.

* * * * *